(12) United States Patent
Cheng et al.

(10) Patent No.: US 7,013,073 B2
(45) Date of Patent: Mar. 14, 2006

(54) METHOD AND APPARATUS FOR FIXING A FIBER AT THE CENTER OF A FERRULE

(75) Inventors: Wood-Hi Cheng, Kaohsiung (TW); Maw-Tyan Sheen, Tainan Shian (TW); Chia-Ming Chang, Kaohsiung Shian (TW)

(73) Assignee: National Sun Yat-Sen University, Kaohsiung (CN)

( * ) Notice: Subject to any disclaimer, the term of this patent is extended or adjusted under 35 U.S.C. 154(b) by 108 days.

(21) Appl. No.: 10/827,651

(22) Filed: Apr. 19, 2004

(65) Prior Publication Data

US 2004/0208457 A1    Oct. 21, 2004

(30) Foreign Application Priority Data

Apr. 21, 2003  (TW) .............................. 92109220 A

(51) Int. Cl.
*G02B 6/00* (2006.01)
(52) U.S. Cl. ............................ 385/134; 385/52; 385/67
(58) Field of Classification Search .................. 385/52, 385/67, 134
See application file for complete search history.

(56) References Cited

U.S. PATENT DOCUMENTS 6,053,398 A * 4/2000 Iizuka et al. ................ 228/254
6,402,392 B1 * 6/2002 Yarita et al. ................... 385/84

OTHER PUBLICATIONS

Wood-Hi Cheng et al., Reduction of Fiber Alignment Shifts in Semiconductor Laser Module package, Journal of Lightwave Technology, Jun. 2000, pp. 842-848, vol. 18, No. 6.
Wood-Hi Cheng et al., Fiber Alignment Shift Formation Mechanisms of Fiber-Solder-Ferrule Joints in Laser Module Packaging, Journal of Lightwave Technology, Aug. 2001, pp. 1177-1184, vol. 19, No. 8.
Wood-Hi Cheng et al., An Optimum Approach for Reduction of Fiber Alignment Shift of Fiber-Solder-Ferrule Joints in Laser Module Packaging, Journal of Lightwave Technology, Feb. 2004, pp. 1-6, vol. 22, No. 2.

* cited by examiner

*Primary Examiner*—Brian Healy
*Assistant Examiner*—Jerry Martin Blevins
(74) *Attorney, Agent, or Firm*—Senniger Powers

(57) ABSTRACT

The invention relates to an apparatus for fixing a fiber at the center of a ferrule comprising a heating stage, a temperature controller, at least one charge-coupled device, a first moving stage, a processor unit and a solder material feeder. The heating stage is used for mounting and heating the ferrule. The charge-coupled devices are used for monitoring the position of the fiber in the ferrule, and one of the charge-coupled devices is connected to the processor unit so as to measure the eccentric offset of the fiber in the ferrule. The first moving stage is used for mounting the fiber and adjusted the position of the fiber so that one end of the fiber is disposed near a inlet of the ferrule and inserting the fiber into the ferrule after alignment. The solder material feeder is used for sealing the ferrule with the solder material. The present invention also relates to a method for fixing a fiber at the center of a ferrule.

20 Claims, 4 Drawing Sheets

METHOD AND APPARATUS FOR FIXING A FIBER AT THE CENTER OF A FERRULE

FIELD OF THE INVENTION

The present invention relates to a method and apparatus for fabricating a fiber-solder-ferrule (FSF), particularly to a method and apparatus for fixing a fiber at the center of a ferrule.

DESCRIPTION OF THE RELATED ART

The fabrication factors that influence the performance of the laser-based transmitters in lightwave communication systems are alignment and fixation of the fiber. Because the core diameter of the single-mode fiber is usually 9 $\mu$m and the material of the fiber is glass (for example, $SiO_2$), which is difficult to deal with, during the process of alignment and fixation of the fiber, it is traditional to coat the fiber with gold to form a metallized fiber which is then fixed in a ferrule by sealing a solder material by capillarity to form a fiber-solder-ferrule (FSF) 10 assembled by the fiber 11, the solder 12 and the ferrule 13, as shown in FIGS. 1 and 1a.

Referring to FIG. 2, the fiber-solder-ferrule (FSF) 10 is mounted on a saddle shaped clip 21 by laser welding, then the saddle shaped clip 21 is mounted on a substrate stage 22 by laser welding so that the fiber 11 can be coupled with the laser diode 24 on the submount 23. Generally speaking, the most difficult task in the fabrication of the laser diode module package lies in how to maintain a high coupling efficiency that needs stable and high accuracy positioning during the fabrication process.

Referring to FIG. 1a, due to the limitation of manufacturing technology, there would be an initial offset A between the axis of the fiber and the axis of the ferrule. After long use time, the axis of the fiber may shift to the axis of the ferrule, which will reduce the coupling efficiency. As a result of temperature cycles of the fiber-solder-ferrule 10, if a minimum displacement of the fiber is desired, the initial offset A must be controlled to be a very small value. It is known from the references [W. H. Cheng, M. T. Sheen, S. C. Wang and J. H. Kuang, "Fiber Alignment Shift Formation Mechanisms of Fiber-Solder-Ferrule Joints in Laser Module Packaging", J. of Lightwave Technology, V19. No. 8, p.842, August 2001] and [W. H. Cheng, M. T. Sheen, J. H. Kuang, H. L. Chang and C. H. Chen, "Reduction of Fiber Alignment Shifts in Semiconductor Laser Module package", J. of Lightwave Technology, V18. No. 6, p.177, June 2000] that when the initial offset A is 75 $\mu$m, after 500 times temperature cycling test under $-40°$ C. to $+85°$ C., the displacement of the fiber is 0.5 $\mu$m, which can influence the coupling efficiency between the fiber 11 and the laser diode 24. Therefore, if the initial offset A is below 75 $\mu$m, the displacement of the fiber after temperature cycling test will be below 0.5 $\mu$m.

Because the fiber has an outer diameter of 125 $\mu$m, in some prior art inventions, the ferrule (usually has an outer diameter of 900 $\mu$m and an inner diameter of 400 $\mu$m) was designed to have an inner diameter of 145 $\mu$m so as to limit the initial offset A within 20 $\mu$m. However, such design makes it difficult to fabricate and raises the cost. Further, the tolerance between the fiber 11 and the wall of the ferrule must be below 10 $\mu$m, which makes the solder sealed in the tolerance too thick and results in poor capillarity. In such case, the intermetallic composition will occupy the most portion of the tolerance during the heating process, and the tin (Sn) composition in the solder will be vacuous rapidly so that the solder is loosened and the combination strength is reduced.

Referring to FIG. 3, the existing method for fabricating a fiber-solder-ferrule comprises the following steps: mounting a ferrule 32 on a heating stage 34 that is attached a temperature controller 33, mounting a fiber 31 on an XYZ stage 35, turning on the temperature controller 33 to raise the temperature of the ferrule 32 to a proper working temperature, adjusting the XYZ stage 35 and inserting the fiber 31 into the ferrule 32 by visual observation and manually, and then sealing the ferrule 32 with a solder material 36 and solidifying the solder material 36 to obtain a fiber-solder-ferrule. The disadvantage of the method is that the fiber would contact the wall of the ferrule easily and form a defective. Additionally, the initial offset A is too large and influences the coupling efficiency.

Consequently, there is a need for novel and improved method and apparatus for fixing a fiber at the center of a ferrule to solve the above-mentioned problem.

SUMMARY OF THE INVENTION

The primary objective of the present invention is to improve the disadvantage of high fraction defective and high initial offset of the fiber-solder-ferrule caused by inserting the fiber into the ferrule by visual observation and manually.

Another objective of the present invention is to provide a method for fixing a fiber at the center of a ferrule, comprising:

(a) mounting the ferrule on a heating stage that is connected a temperature controller;

(b) mounting the fiber on a first moving stage and adjusting the position of the first moving stage so that one end of the fiber is disposed near an inlet of the ferrule;

(c) heating the ferrule to a proper working temperature;

(d) monitoring the position of the fiber in the ferrule by utilizing at least one charge-coupled device (CCD), wherein one of the at least one charge-coupled device is connected to a processor unit so as to measure the eccentric offset of the fiber in the ferrule, wherein the processor unit comprises an image capture unit and an shift calculation software;

(e) adjusting the first moving stage according to the eccentric offset of the fiber in the ferrule measured in step (d) so that the fiber is concentric with the ferrule, and then inserting the fiber into the ferrule and throughout the outlet of the ferrule;

(f) sealing the ferrule with a solder material; and (g) solidifying the solder material to obtain a fiber-solder-ferrule.

To achieve the above method, the present invention provides an apparatus for fixing a fiber at the center of a ferrule, comprising: a to heating stage, a temperature controller, three charge-coupled devices, a first moving stage, a processor unit, a solder material feeder and a second moving stage.

DETAILED DESCRIPTION OF THE DRAWINGS

DETAILED DESCRIPTION OF THE INVENTION

Figures 1, 1A:
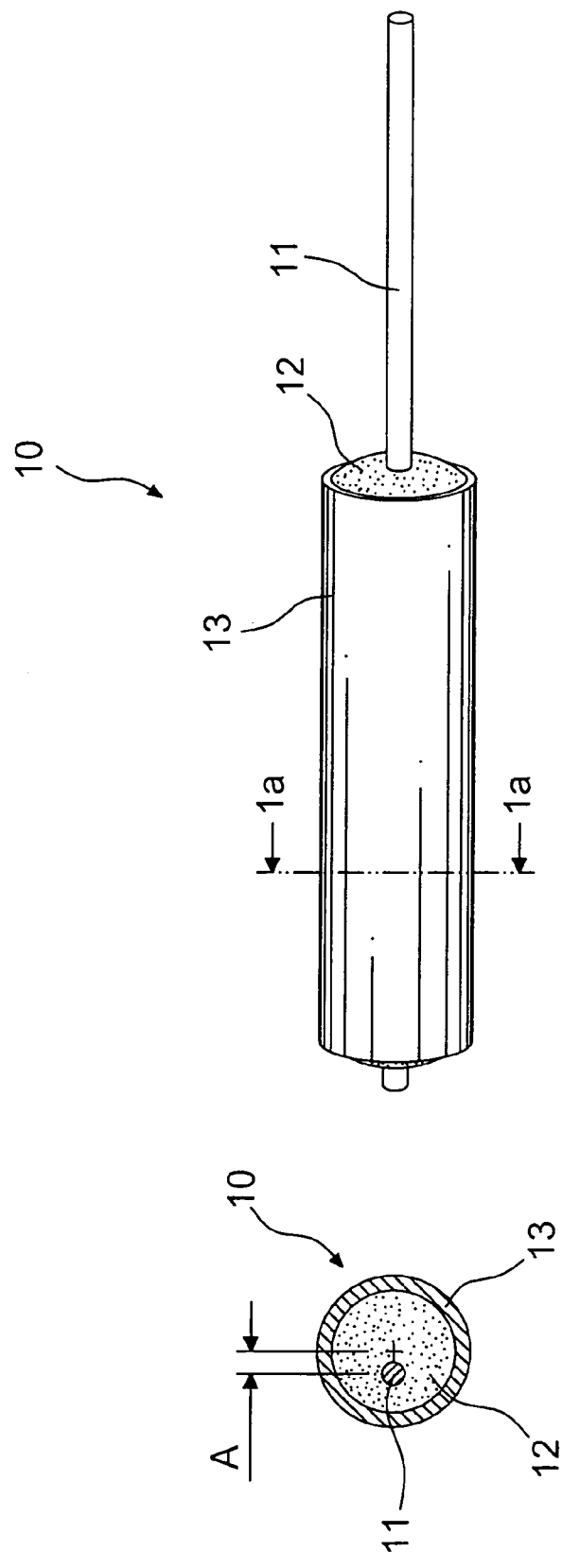
FIG. 1 is a side view of a typical fiber-solder-ferrule.
FIG. 1a is a cross-sectional view along line 1a—1a in FIG. 1.
Figure 2:
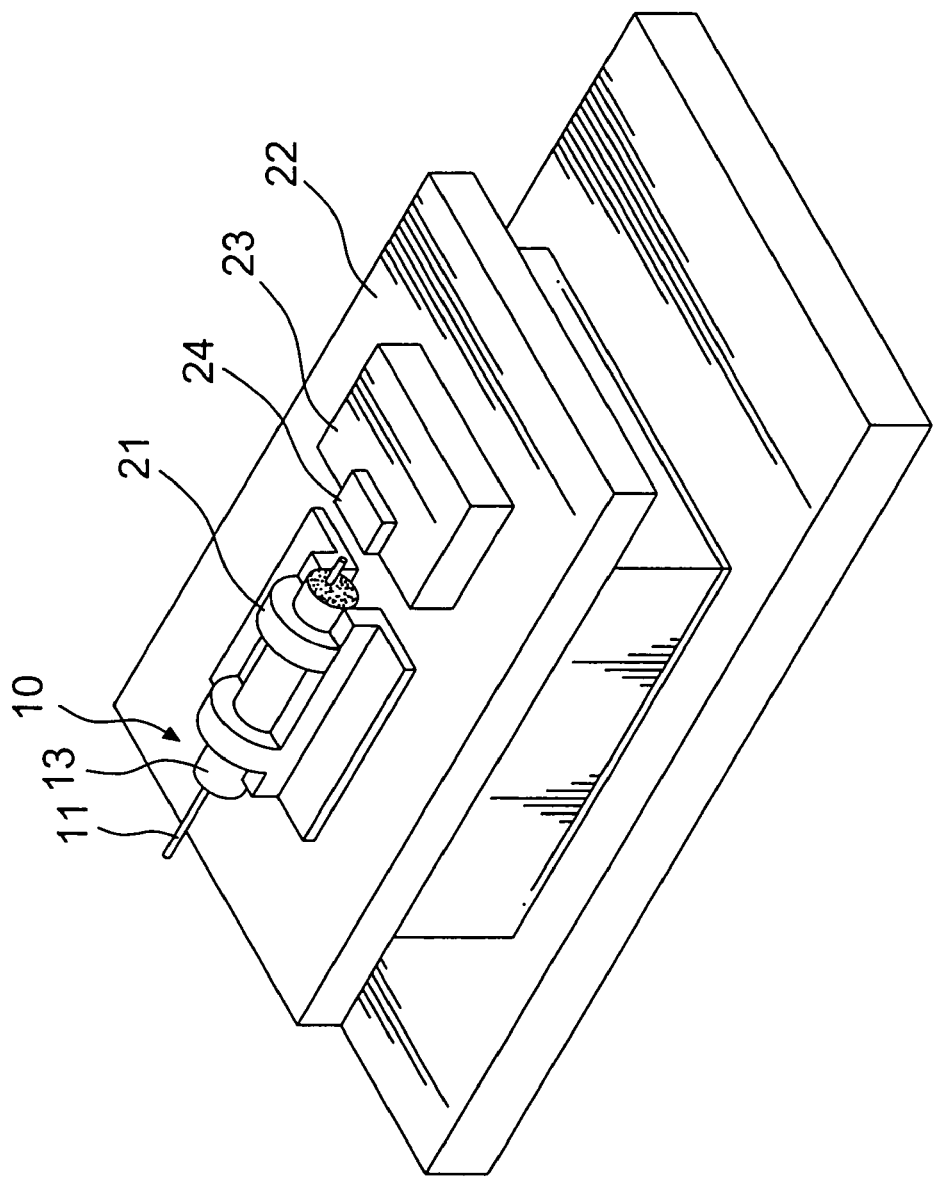
FIG. 2 is a perspective view of a typical apparatus for mounting a fiber-solder-ferrule.
Figure 3:
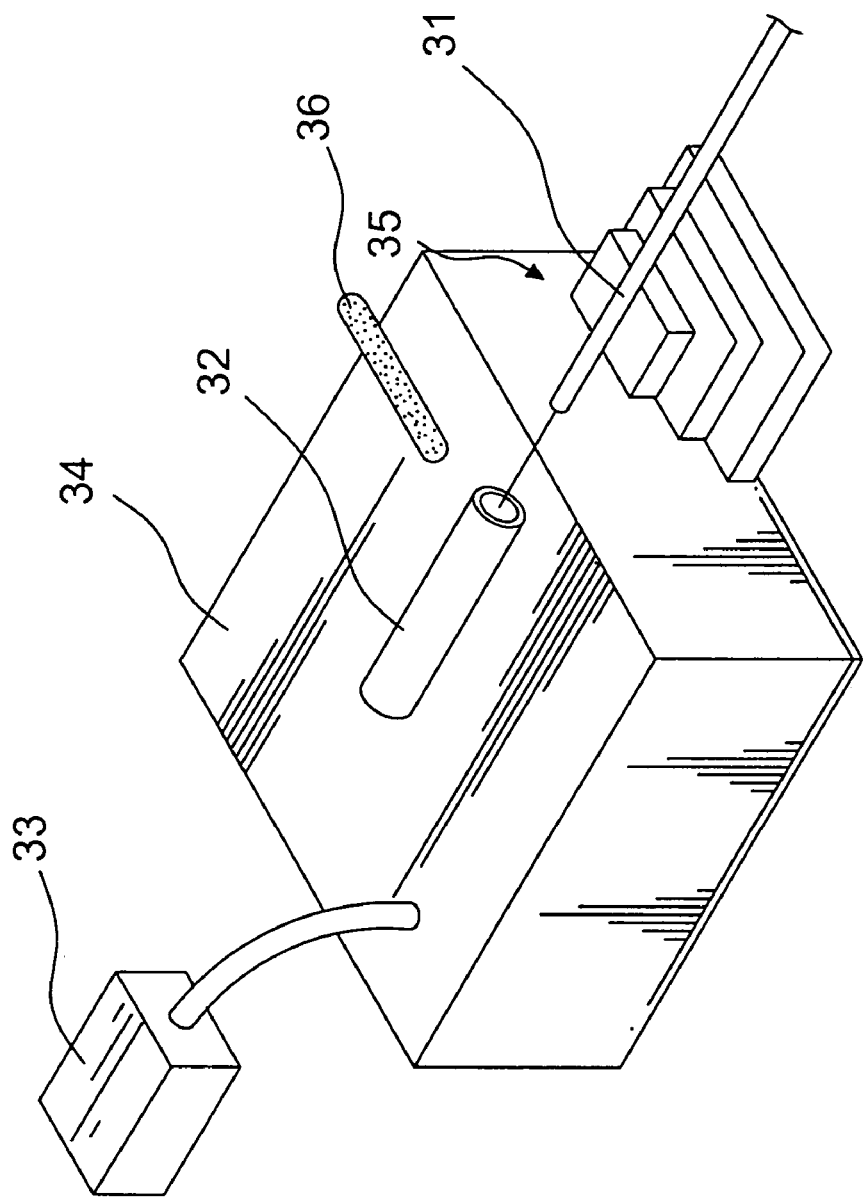
FIG. 3 is a perspective view of a typical apparatus for fabricating a fiber-solder-ferrule.
Figure 4:
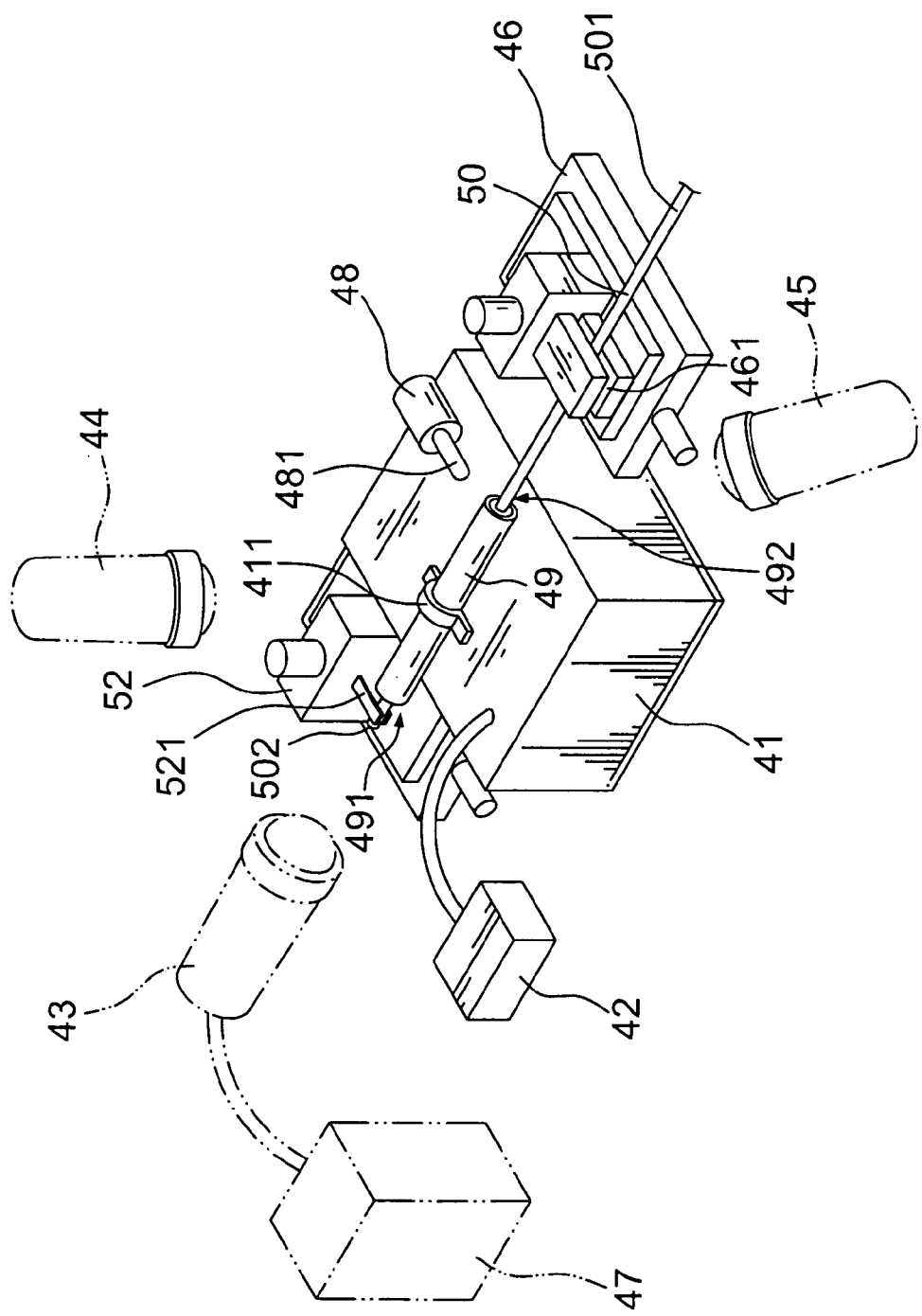
FIG. 4 is a perspective view of an apparatus for fixing a fiber at the center of a ferrule according to the preferred embodiment of the present invention.

Referring to FIG. 4, the apparatus for fixing a fiber at the center of a ferrule according to the preferred embodiment of the present invention comprises a heating stage 41, a temperature controller 42, at least one charge-coupled-devices 43, 44, 45, a moving stage 46 (for example, an XYZ stage), a processor unit 47 (for example, a computer), a solder material feeder 48 and a second moving stage 52.

The ferrule 49 is mounted on the heating stage 41 by utilizing a holder 411; the holder 411 comprises a layer of asbestos fiber (not shown in the figure) that is used to cause a homogenous temperature distribution along the ferrule 49. The temperature controller 42 is connected to the heating stage 41 to control the temperature of the heating stage 41 and the ferrule 49.

The charge-coupled devices 43, 44, 45 are used for monitoring the position of the fiber 50 in the ferrule 49. In the embodiment, the amount of charge-coupled device is three, wherein a first charge-coupled device 43 is disposed near the outlet 491 of the ferrule 49 and on the axis of the ferrule 49 to observe the relative position between the fiber 50 and the wall of the ferrule 49. In addition, a second charge-coupled device 44 is disposed on top of the ferrule 49, and a third charge-coupled device 45 is disposed near the inlet 492 of the ferrule 49 to observe the inlet 492 with an inclination angle, and can be moved to the outlet 491 of the ferrule 49 to observe the outlet 491 with an inclination angle, the second and third charge-coupled devices 44, 45 are used for observing the inclination between the axis of the fiber and the axis of the ferrule. Alternatively, the second and third charge-coupled devices 44, 45 are respectively disposed on two perpendicular radius axes of the ferrule 49.

The first charge-coupled device 43 is connected to the processor unit 47 that comprises an image capture unit and an shift calculation software that are used to find out the central point of the outlet 491 of the ferrule 49, and the central point of the fiber 50, and then determine their difference as the eccentric offset.

In this embodiment, the image capture unit is Clustering auto-threshold method image capture unit that uses lightness-brightness contrast of at least 50%—50% to capture image. The shift calculation software is the Sobel theory computer-aid shift calculation software designed by Lab View software, and the shift calculation software uses lightness-brightness contrast of at least 50%—50% and above to detect the edge of an object and the image of the interference. Because the blur of the image on the edge of the ferrule 49, Sobel theory is used to detect the edge, and then Clustering auto-threshold method is used to separate the ferrule 49 from background. After calculating the separated ferrule by surface refinement algorithm, a pixel-filter is applied to filter the undesired portion to determine the points on the circumference. Finally, the points on the circumference are used to determine the center point and the radius of the ferrule 49. As to the fiber 50, because it is near the center and the blur is not serious, Clustering auto-threshold method is used directly to separate the fiber 50 from background. After the pixel-filter is applied to filter the undesired portion, the mass center and radius of the fiber 50 can be determined. Finally, the eccentric offset between the center of the ferrule 49 and the center of the fiber 50 is determined on the basis of the outer radius of the ferrule 49 of 900 $\mu$m. Alternatively, other suitable image capture units and shift calculation software can also be used, which is easily made by the people skilled in the art.

The rear end 501 of the fiber 50 is held by the V-groove 461 of the first moving stage 46 that is disposed near the inlet 492 of the ferrule 49. The front end 502 of the fiber 50 is held by the gripper 521 of the second moving stage 52 that is disposed near the outlet 491 of the ferrule 49. In the prior method, no fixture is used to hold the fiber 50; therefore, in the procedures of sealing and solidifying the solder material, the fiber 50 will move and shift from the pre-aligned position. The first moving stage 46 is used for adjusting the position of the fiber 50 to be concentric with the ferrule 49, and then inserting the fiber 50 into the ferrule 49 and through-out the outlet 491 of the ferrule 49. The free front end 502 of the fiber 50 is gripped by the gripper 521 of the second moving stage 52 so as to enhance the fixing effect. The gripper 521 is designed to be small and thin but rigid so that the above-mentioned calculation will not be affected by the large area of the gripper 521.

The solder material feeder 48 is disposed near and above the inlet 492 of the ferrule 49. When the temperature controller 42 heats the ferrule 49 to a stable working temperature (i.e., melting temperature), the solder material feeder 48 feeds a solder material 481 to contact the inlet 492 of the ferrule 49, and then the solder material 481 is molten and flows into the ferrule 49 by surface tension or capillarity, and forms a taper appearance in the outlet 491 of the ferrule 49. The solder material 481 is tin-lead alloy (Pb(37%)/Sn (63%) with a melting temperature of 183° C.) or tin-gold alloy (Au(80%)/Sn(20%) with a melting temperature of 280° C.), which depends on demand.

The procedure of the method of the preferred embodiment of the present invention is described above. First, the fiber 50 is coated with nickel (Ni), gold (Au), or the alloy thereof to form a metallized fiber 50. Secondly, the ferrule 49 is disposed on the heating stage 41 and mounted by the holder 411. Then the fiber 50 is disposed on the first moving stage 46 and fixed by the V-groove 461 so that the free front end of the fiber 50 faces the inlet 492 of the ferrule 49. After the temperature controller 42 is operated, the temperature of the ferrule 49 is raised to above the melting temperature of the solder material; taking tin-lead (Pb(37%)/Sn(63%)) solder for example, the predetermined temperature is 230° C. Then the first charge-coupled-device 43, the image capture unit and the shift calculation software are used to measure the eccentric offset between the central point of the ferrule 49 and the central point of the fiber 50. The first moving stage 46 is adjusted according to the eccentric offset to make the fiber 50 concentric with the ferrule 49. After conforming the position of the fiber 50 by the second charge-coupled device 44 and third charge-coupled device 45, the first moving stage 46 is used to insert the front end 502 of the fiber 50 into the ferrule 49 and through-out the outlet 491 of the ferrule 49. Then the front end 502 of the fiber 50 is gripped by the gripper 521 of the second moving stage 52. During the inserting process, the three charge-coupled devices 43, 44, 45 must be used continuously to conform that the fiber 50 and the ferrule 49 are concentric and there is no inclination between the axis of the fiber 50 and the axis of the ferrule 49.

Because of the thermal expansion and cooling shrinkage of the heating stage 41, the zero eccentric offset obtained by the above procedures will increase during the procedures of sealing and solidifying the solder material 481, that is, the temperature of the heating stage 41 is lowered from 230° C.

to 183° C. The solution is pre-compensating method, that is, if the calculation by the software shows that the eccentric offset after solidification procedure is (X-axis:−10 μm, Y-axis: 10 μm), then the fiber 50 is put at the position of (X-axis: 10 μm, Y-axis:−10 μm) observed by the first charge-coupled device 43 before sealing procedure so that the eccentric offset after solidification procedure can approximate to zero theoretically.

When the temperature of the heating stage 41 becomes stable, the heating stage 41 is ready for sealing the solder material 481. Then the solder material feeder 48 feeds the solder material 481 to contact the inlet 492 of the ferrule 49, and then the solder material 481 is molten and flows into the ferrule 49 by surface tension or capillarity. The layer of asbestos fiber (not shown in the figure) that covers the holder 411 can avoid the relative chilly zone caused by the absorbing heat effect of the holder 411 at the middle of the ferrule 49 and can cause a homogenous temperature distribution along the ferrule 49. Finally, the temperature controller 42 is turned off and the solder material 481 is solidified to obtain a fiber-solder-ferrule.

It is found from the metallographic technique that the initial eccentric offsets of the fiber-solder-ferrules obtained by the method of the present invention are within 20 μm, and the fiber-solder-ferrules have no defect of void.

While several embodiments of this invention have been illustrated and described, various modifications and improvements can be made by those skilled in the art. The embodiments of this invention are therefore described in an illustrative but not restrictive sense. It is intended that this invention may not be limited to the particular forms as illustrated, and that all modifications that maintain the spirit and scope of this invention are within the scope as defined in the appended claims.

What is claimed is:

1. A method for fixing a fiber at the center of a ferrule, comprising:
   (a) mounting the ferrule on a heating stage;
   (b) mounting the fiber on a first moving stage and adjusting the position of the first moving stage so that one end of the fiber is disposed near an inlet of the ferrule;
   (c) heating the ferrule to a proper working temperature;
   (d) monitoring the position of the fiber in the ferrule by utilizing at least one charge-coupled devices (CCD), wherein the charge-coupled device is connected to a processor unit so as to measure the eccentric offset of the fiber in the ferrule;
   (e) adjusting the first moving stage so that the fiber is concentric with the ferrule, and then inserting the fiber into the ferrule and through-out the outlet of the ferrule;
   (f) sealing the ferrule with a solder material; and
   (g) solidifying the solder material to obtain a fiber-solder-ferrule.

2. The method according to claim 1, wherein the step (a) a holder is utilized to fix the ferrule on a heating stage.

3. The method according to claim 1, further comprises a step of coating the fiber with gold before the step (b).

4. The method according to claim 1, wherein the amount of charge-coupled-devices in the step (d) is three, wherein a first charge-coupled-device is disposed near the outlet of the ferrule and on the axis of the ferrule to observe the relative position between the fiber and the wall of the ferrule, a second and a third charge-coupled devices are respectively disposed on two perpendicular radius axes of the ferrule to observe the inclination between the axis of the fiber and the axis of the ferrule.

5. The method according to claim 1, wherein the amount of charge-coupled-devices in the step (d) is three, wherein a first charge-coupled device is disposed near the outlet of the ferrule and on the axis of the ferrule to observe the relative position between the fiber and the wall of the ferrule, a second charge-coupled device is disposed above the ferrule, and a third charge-coupled device is disposed near the inlet of the ferrule to observe the inlet with an inclination angle, and the third charge-coupled device can be moved to the outlet of the ferrule to observe the outlet with an inclination angle, the second and third charge-coupled devices are used for observing the inclination between the axis of the fiber and the axis of the ferrule.

6. The method according to claim 1, wherein the solder material is selected from a group consisting of tin-lead alloy (PbSn) and tin-gold alloy (AuSn).

7. The method according to claim 1, wherein the step (f) the solder material is fed to contact the inlet of the ferrule, and then the solder material is molten and flows into the ferrule by surface tension, and forms a taper appearance in the outlet of the ferrule.

8. The method according to claim 1, wherein the fiber-solder-ferrule obtained in step (g) has an eccentric offset of 0 to 20 μm between the axis of the fiber and the axis of the ferrule.

9. The method according to claim 1, wherein after step (e) further comprises a step of gripping the front end of the fiber by utilizing a gripper on a second moving stage near the outlet of the ferrule.

10. An apparatus for fixing a fiber at the center of a ferrule, comprising:
    a heating stage for mounting and heating the ferrule;
    a temperature controller connected to the heating stage and used for controlling the temperature of the heating stage;
    at least one charge-coupled device for monitoring the position of the fiber in the ferrule;
    a first moving stage for mounting the fiber thereon, adjusting the position thereof so that one end of the fiber is disposed near an inlet of the ferrule and inserting the fiber into the ferrule after alignment;
    a processor unit comprising an image capture unit and an shift calculation software, one of the charge-coupled device is connected to the processor unit so as to measure an eccentric offset of the fiber in the ferrule; and
    a solder material feeder for feeding a solder material to contact the inlet of the ferrule, and sealing the ferrule with the solder material.

11. The apparatus according to claim 10, wherein the heating stage further comprises a holder used for mounting the ferrule on the heating stage, the holder comprises a layer of asbestos fiber used to cause a homogenous temperature distribution along the ferrule.

12. The apparatus according to claim 10, wherein the fiber is coated with a layer of gold before being mounted on the first moving stage.

13. The apparatus according to claim 10, wherein the amount of charge-coupled device is three, a first charge-coupled device is disposed near the outlet of the ferrule and on the axis of the ferrule to observe the relative position between the fiber and the wall of the ferrule, a second and a third charge-coupled devices are respectively disposed on two perpendicular radius axes of the ferrule to observe the inclination between the axis of the fiber and the axis of the ferrule.

14. The apparatus according to claim 10, wherein the amount of charge-coupled device is three, a first charge-coupled device is disposed near the outlet of the ferrule and on the axis of the ferrule to observe the relative position between the fiber and the wall of the ferrule, a second charge-coupled device is disposed above the ferrule, and a third charge-coupled device is disposed near the inlet of the ferrule to observe the inlet with an inclination angle, and the third charge-coupled device can be moved to the outlet of the ferrule to observe the outlet with an inclination angle, the second and third charge-coupled devices are used for observing the inclination between the axis of the fiber and the axis of the ferrule.

15. The apparatus according to claim 10, wherein the image capture unit uses lightness-brightness contrast of at least 50%—50% to capture image.

16. The apparatus according to claim 10, wherein the shift calculation software is a computer-aid shift calculation software.

17. The apparatus according to claim 16, wherein the computer-aid shift calculation software uses lightness-brightness contrast of at least 50%—50% and above to detect the edge of an object and the image of the interference.

18. The apparatus according to claim 10, wherein the solder material is selected from a group consisting of tin-lead alloy (PbSn) and tin-gold alloy (AuSn).

19. The apparatus according to claim 10, wherein the eccentric offset between the axis of the fiber and the axis of the ferrule is below 20 $\mu$m after the fiber is fixed in the ferrule.

20. The apparatus according to claim 10, further comprises a second moving stage with a gripper that is used for gripping the front end of the fiber.

* * * * *